(12) United States Patent
Miyata

(10) Patent No.: US 7,248,410 B2
(45) Date of Patent: Jul. 24, 2007

(54) TRANSMISSION TYPE SCREEN

(75) Inventor: Hideki Miyata, Tokyo-to (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 11/220,653

(22) Filed: Sep. 8, 2005

(65) Prior Publication Data
US 2006/0001975 A1  Jan. 5, 2006

Related U.S. Application Data

(63) Continuation-in-part of application No. PCT/JP2004/005906, filed on Apr. 23, 2004.

(30) Foreign Application Priority Data

Apr. 24, 2003  (JP)  .............................. 2003-120379

(51) Int. Cl.
*G02B 27/10* (2006.01)
*G03B 21/60* (2006.01)
(52) U.S. Cl. ...................... 359/619; 359/455
(58) Field of Classification Search ........ 359/619–623, 359/625, 453, 455–457, 460
See application file for complete search history.

(56) References Cited
U.S. PATENT DOCUMENTS
2005/0117213 A1 *  6/2005  Honda et al. ............... 359/457

FOREIGN PATENT DOCUMENTS

| JP | A-05-204048 | 8/1993 |
|---|---|---|
| JP | A-07-248537 | 9/1995 |
| JP | A-08-137010 | 5/1996 |
| JP | A-2002-139800 | 5/2002 |
| JP | A-2002-169224 | 6/2002 |
| JP | A-2003-050427 | 2/2003 |
| WO | WO 98/32049 A1 | 7/1998 |

\* cited by examiner

*Primary Examiner*—Alicia M Harrington
(74) *Attorney, Agent, or Firm*—Oliff & Berridge, PLC

(57) ABSTRACT

There is provided a transmission type screen that can suppress deterioration of image quality due to glare distortion of external light and the like that occurs on a screen surface while keeping a feeling (a glossy feeling of an image) as if a CRT-TV is directly viewed. The transmission type screen 10 is arranged by combining a plurality of screen members (for example, a lenticular lens sheet 11 and a Fresnel lens sheet 12), which realize various optical functions such as transmission, diffusion, condensing and the like of light, with each other. A smooth surface having a surface roughness Ra of $0\ \mu m \leq Ra \leq 0.5\ \mu m$ is formed on the viewer side surface of a nearest-to-viewer side screen member (for example, the lenticular lens sheet 11) of the plurality of screen members, as well as the amount of warping D of the nearest-to-viewer side screen member (for example, the lenticular lens sheet 11) is $-10\ mm \leq D \leq 15\ mm$.

11 Claims, 6 Drawing Sheets

TRANSMISSION TYPE SCREEN

This is a Continuation-in-Part of International Application No. PCT/JP2004/005906 filed Apr. 23, 2004, which claims the benefit of Japanese Patent Application No. 2003-120379 filed Apr. 24, 2003. The entire disclosure of the prior applications is hereby incorporated by reference herein in its entirety.

TECHNICAL FIELD

The present invention relates to a transmission type screen used as a component of a rear projection type projection system such as projection television and the like. More particularly, the present invention relates to a transmission type screen giving a glossy feeling to an image making use of the glare of external light and the like occurring on the outermost surface on a viewer side.

BACKGROUND ART

At present, an arrangement, in which a Fresnel lens sheet and a lenticular lens sheet are disposed in this order from a light source side, is ordinarily used as the transmission type screen. Further, recently, an arrangement, in which a transparent front sheet or a front sheet subjected to coloring processing is disposed on the viewer side of a lenticular lens sheet, is also used (refer to Japanese Patent Application Laid-Open Publications Nos. 7-248537 and 8-137010 (patent documents 1 and 2)).

Incidentally, in the transmission type screen using the front sheet, it can be prevented that the surface of the lenticular lens sheet is scratched. Further, when the surface of the front sheet is made smooth, a feeling as if a CRT-TV is directly viewed (a glossy feeling of an image) can be provided making use of the glare of external light and the like occurring on the surface of the front sheet. This feeling is greatly appreciated as image quality, and this is one of leading reasons why this type of sheets is widely used.

In the transmission type screen using the front sheet described above, however, when the front sheet is deformed, the glare of the external light and the like occurring on the surface of the front sheet is also distorted. In this case, a problem arises in that the image quality is greatly deteriorated because a very uncomfortable feeling is given to the viewer.

To solve the above problem, there is conventionally proposed a method of making the viewer unanxious to the distortion of the glare by suppressing the glare itself of the external light and the like by making the surface of the front sheet rough. However, this method is disadvantageous in that the feeling of an image as if the CRT-TV is directly viewed, which is obtained by the smooth surface of the front sheet, is naturally lost, from which a problem arises in that the image quality is deteriorated in this point of view.

DISCLOSURE OF THE INVENTION

An object of the present invention, which has been made to solve the above problems, is to provide a transmission type screen that can suppress deterioration of image quality due to the glare distortion of external light and the like occurring on a screen surface while keeping a feeling (glossy feeling of image) as if a CRT-TV is directly viewed.

In a transmission type screen according to the present invention comprising a plurality of screen members combined with each other to realize various optical functions such as transmission, diffusion, condensing and the like of light, the transmission type screen is characterized in that a smooth surface having a surface roughness Ra of $0\ \mu m \leq Ra \leq 0.5\ \mu m$ is formed on the viewer-side surface of a nearest-to-viewer side screen member, which is located nearest to a viewer side, of the plurality of screen members, as well as the amount of warping D of the nearest-to-viewer side screen member is $-10\ mm \leq D \leq 15\ mm$. It is preferable that the surface roughness Ra of the viewer side surface of the nearest-to-viewer side screen member be $0\ \mu m \leq Ra \leq 0.5\ \mu m$ at least in light outgoing portions, through which image light is transmitted, of the viewer side surface.

The term "surface roughness Ra" used in the description means an average roughness of a center line defined in JIS B0601. Further, the term "amount of warping D" means an amount of displacement of the center of a screen (screen surface) from a reference plane with respect to the position of an edge of the screen acting as a reference, and the amount of warping D is calculated by, for example, the following measuring method.

That is, as shown in FIGS. 9 and 10, when a screen member 101 is set to a TV frame 102, the amount of warping D is calculated as the distance between a measurement reference line $M_1$ (a straight line connecting the upper side center $P_1$ of the screen to the lower side center $P_2$ thereof) or a measurement reference line $M_2$ (a straight line connecting the left side center $P_3$ of the screen to the right side center $P_4$ thereof) and the center $P_c$ of the screen. Although the amount of warping D can be measured by various methods, a method shown in FIG. 11, for example, is exemplified as a simple method. That is, as shown in FIG. 11, a straight edge ruler 103 is placed at the center of the back-side surface of the TV frame 102 (for example, a position corresponding to the measurement reference line $M_1$), and the distances A, B, and C from the straight edge ruler 103 to the upper and lower side centers $P_1$ and $P_2$ of on the screen of the screen member 101 and to the center $P_c$ of the screen. Then, the amount of warping D is calculated according to a calculation formula "$D=(A+B)/2-C$" based on the distances A, B, and C measured as described above. Note that although the amount of warping D may have any of a positive value and a negative value, it is assumed here that when the screen member warps to a light source side, the amount of warping D has a positive value, and when it warps to a viewer side, the amount of warping D has a negative value.

According to the present invention, the smooth surface having the surface roughness Ra of $0\ \mu m \leq Ra \leq 0.5\ \mu m$ is formed on the viewer side surface of the nearest-to-viewer side screen member, which is located nearest to the viewer side, of the plurality of screen members constituting the transmission type screen, as well as the amount of warping D of the nearest-to-viewer side screen member is set to $-10\ mm \leq D \leq 15\ mm$. Accordingly, deterioration of image quality due to the glare distortion of external light and the like occurring on the screen surface can be suppressed while keeping the feeling as if the CRT-TV is directly viewed (glossy feeling of image).

To provide an image with the glossy feeling, at least light outgoing portions, through which image light is transmitted, of the viewer side surface of the nearest-to-viewer side screen member must be kept smooth in a certain degree. As to this point, the inventor derived the relation between the surface roughness of the light outgoing portions and the glossy feeling of an image by evaluating an image. As a result, the inventor has found that when the surface roughness Ra of at least the light outgoing portions of the viewer side surface is within the range of $0\ \mu m \leq Ra \leq 0.5\ \mu m$, an excellent glossy feeling of an image can be kept. When the surface roughness Ra exceeds 0.5 μm, external light is intensively diffused and reflected on the surfaces of the light outgoing portions, thereby a white-tinged brown is formed by external light mixed with image light.

Further, the inventor evaluated an uncomfortable feeling caused by the glare distortion of external light and the like by changing the amount of warping D of the nearest-to-viewer side screen member in which the surface roughness Ra of at least the light outgoing portions of the viewer side surface was within the range of $-10 \text{ mm} \leq D \leq 15 \text{ mm}$. As a result, the inventor has found that when the amount of warping D of the nearest-to-viewer side screen member is within the range of $-10 \text{ mm} \leq D \leq 15 \text{ mm}$ at the time the surface roughness Ra is within the above range, an obtained image can be accepted from the feeling of a viewer. When the amount of warping D is less than $-10$ mm or exceeds 15 mm, the surface of the nearest-to-viewer side screen member acts as if it is a convex mirror or a concave mirror, and further, the curvature of the surface of the mirror may be different in a longitudinal direction and in a lateral direction. Accordingly, the glare of external light and the like is enlarged at a different magnification in the longitudinal direction and in the lateral direction, thereby the viewer observes greatly distorted glare. Note that even if the amount of warping D is within the above range, the amount is not suitable when the nearest-to-viewer side screen member waves. This is because glare is abnormally distorted thereby.

In the present invention, the amount of warping of the screen member, which is located nearest to the light source side, of the plurality of screen members is preferably equal to or less than the amount of warping D of the nearest-to-viewer side screen member. With this arrangement, it is possible to press the overall transmission type screen from both the sides thereof by both the screen members located nearest to the light source side and to the viewer side. Accordingly, the screen member located between both the screen members is sandwiched therebetween so that these screen members can be made to a single sheet. Therefore, it is possible to prevent spaces from being formed between the respective screen members constituting the transmission type screen, thereby deterioration of image quality due to the spaces can be effectively prevented.

In the present invention, it is preferable that the smooth surface be formed on the viewer side surface of the nearest-to-viewer side screen member and that a lenticular lens group be formed on the light source side surface thereof. In this case, since an image arrangement surface is disposed just behind the smooth surface, it is possible to obtain image quality nearer to that obtained on the directly viewed CRT-TV.

It is preferable that the smooth surface be formed on the overall viewer side surface of the nearest-to-viewer side screen member. With this arrangement, a more glossy feeling can be obtained.

Further, it is preferable that the nearest-to-viewer side screen member be arranged by bonding a member for forming the smooth surface and a member for forming the lenticular lens group with each other. With this arrangement, it is possible to add desired optical performances by forming the smooth surface and the lenticular lens group on a different member, respectively, thereby the screen member as described above can be easily manufactured.

In the present invention, it is preferable that the smooth surface be formed on the viewer side surface of the nearest-to-viewer side screen member and that a fly eye lens group be formed on the light source side surface thereof. In this case, since an image arrangement surface is disposed just behind the smooth surface, it is possible to obtain image quality nearer to that obtained on the directly viewed CRT-TV. Further, since diffusion can be controlled in two directions by the fly eye lens group, an optical control can be executed in a wider range.

It is preferable that the smooth surface be formed on the overall viewer side surface of the nearest-to-viewer side screen member. With this arrangement, a more glossy feeling can be obtained. Further, it is preferable that the nearest-to-viewer side screen member be arranged by bonding a member for forming the smooth surface and a member for forming the fly eye lens group with each other. With the above arrangement, it is possible to add desired optical performances by forming the smooth surface and the fly eye lens group on a different member, respectively, thereby the screen member as described above can be easily manufactured.

Further, in the present invention, it is preferable that a reflection preventing layer (an antireflection layer) be formed at least on the light outgoing portions, through which image light is transmitted, of the nearest-to-viewer side screen member. With this arrangement, the intensity of the glare of external light and the like occurring on the viewer side uppermost surface can be lowered, which permits to appropriately control the degree of glare according to a necessary and desired glossy feeling. Even in this case, an uncomfortable feeling felt by the viewer as to glare is caused by that he or she observes glare having distortion different from that of an image by overlapping the glare on the image. Accordingly, it is still preferable to take the amount of warping D of a screen member into consideration even in the screen member which can reduce the intensity of glare by forming the reflection preventing layer.

MODES FOR CARRYING OUT THE INVENTION

An embodiment of the present invention will be explained below with reference to the drawings.

First, a transmission type screen according to the embodiment of the present invention will be explained with reference to FIG. 1. Note that the transmission type screen according to the embodiment is preferably assembled in a rear projection type projection system having a large screen of about 40 to 65 inches for use. As a light source used together with the transmission type screen according to the embodiment, a liquid crystal display and an MD (micro device) type light source such as a DLP (digital light processing) and the like may be used in addition to a three-tube type CRT.

Figure 1:
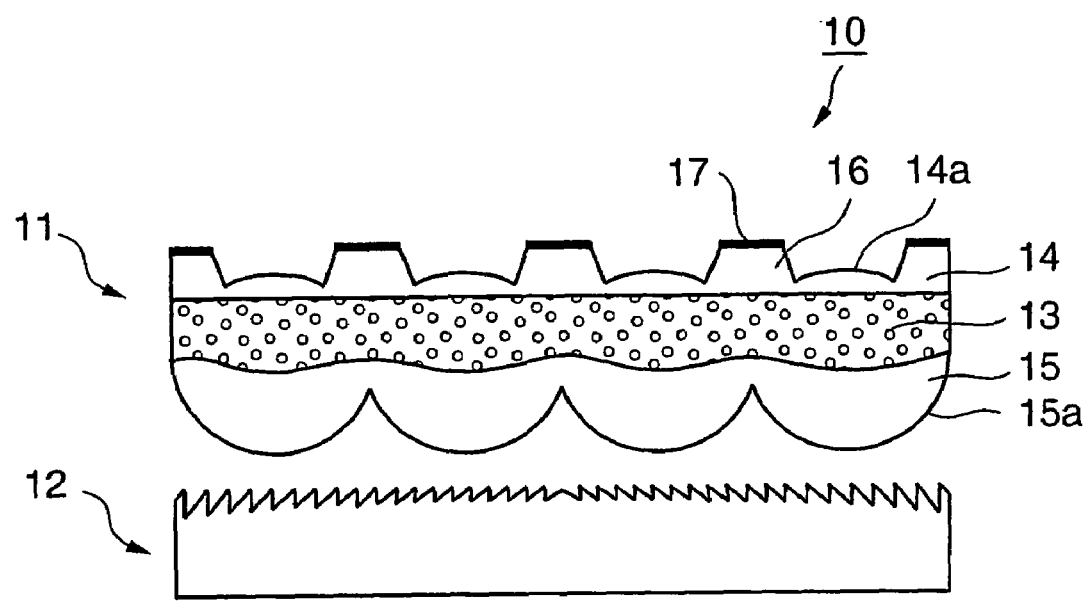
FIG. 1 is a schematic sectional view showing a transmission type screen according to an embodiment of the present invention.

As shown in FIG. 1, the transmission type screen 10 according to the embodiment includes a lenticular lens sheet 11 and a Fresnel lens sheet 12 as screen members for realizing various optical functions such as transmission, diffusion, condensing and the like of light, and they are disposed in this order from a viewer side. The lenticular lens sheet 11 and the Fresnel lens sheet 12 as the screen members are composed of a sheet-shaped film or a film which can be wound.

In these screen members, the lenticular lens sheet 11, which is a nearest-to-viewer side screen member located nearest to the viewer side includes a light diffusion layer 13 as an intermediate layer, and clear layers 14 and 15 disposed on the viewer side and to a light source side of the light diffusion layer 13, respectively. A transparent resin such as an acrylic resin, a polyvinyl chloride resin and the like, in which beads (resin beads composed of a bridged acrylic resin, a bridged acryl-styrene copolymer resin, a bridged styrene resin and the like, and beads composed of glass, silica, alumina and the like) having a different refraction factor and acting as a light diffusion agent are dispersed, is preferably used as the light diffusion layer 13. Further, a transparent resin such as an acrylic resin, a vinyl chloride resin, and the like is preferably used as the clear layers 14 and 15.

A lenticular lens group 15$a$ is formed on the light source side surface of the clear layer 15. Further, a lenticular lens group 14$a$ and convex portions 16 are formed on the viewer side surface of the clear layer 14. Note that any of the lenticular lens groups 14$a$ and 15$a$ and the convex portions 16 is formed to extend in a vertical direction (up/down direction) when the transmission type screen 10 is used.

Of these components, the viewer side lenticular lens group 14$a$ is formed on light outgoing portions, through which the image light condensed by the light source side lenticular lens group 15$a$ is transmitted, of the viewer side surface of the lenticular lens sheet 11. The convex portions 16 are formed on light non-outgoing portions, through which the image light condensed by the light source side lenticular lens group 15$a$ is not transmitted, of the viewer side surface of the lenticular lens sheet 11. Black external light absorbing portions 17 are formed on the convex portions 16.

It is preferable that the surface of the lenticular lens group 14$a$, which is located on the light outgoing portions of the viewer side surface of the clear layer 14 disposed on the viewer side of the lenticular lens sheet 11 acting as the nearest-to-viewer side screen member, be composed of a smooth surface having a surface roughness Ra of 0 µm$\leq$Ra$\leq$0.5 µm. As described above, the surface roughness Ra is the average roughness of the center line defined in JIS B0601. In the lenticular-lens sheet 11, it is preferable that not only the surface roughness Ra of the surface of the lenticular lens group 14$a$ of the clear layer 14 but also the surface roughness Ra of the entire surface of the clear layer 14 (that is, the surface of the lenticular lens group 14$a$ and the surface of the external light absorbing portions 17) be 0 µm$\leq$Ra$\leq$0.5 µm. Further, it is preferable that the lenticular lens sheet 11 have an amount of warping D of $-10$ mm$\leq$D$\leq$15 mm. The amount of warping D is calculated by the measuring method as described above.

As a method of manufacturing the lenticular lens sheet 11, which is composed of the light diffusion layer 13 and the clear layers 14 and 15 arranged as described above, any arbitrary existing molding methods such as a multi-layer extrusion molding method, a cast molding method, an injection molding method, a press molding method, and the like can be employed. Further, various print methods (a screen print method, a gravure offset print) and the like can be used as a method of forming the external light absorbing portions 17 on the convex portions 16 of the clear layer 14.

(First Modified Mode)

In the transmission type screen 10 shown in FIG. 1, the lenticular lens sheet 11 acting as the nearest-to-viewer side screen member is arranged as a double-sided lenticular lens sheet. However, the lenticular lens sheet is not limited thereto and, like a transmission type screen 20 shown in FIG. 2, a lenticular lens sheet 21 acting as the nearest-to-viewer side screen member may be composed of a single-sided lenticular lens sheet. In the transmission type screen 20 shown in FIG. 2, the lenticular lens sheet 21 is used together with a Fresnel lens sheet 22 disposed on the light source side.

The lenticular lens sheet 21 includes a light diffusion layer 23 disposed on the light source side and a light diffusion layer 24 disposed on the viewer side. A transparent resin such as an acrylic resin, a polyvinyl chloride resin and the like, in which beads (resin beads composed of a bridged acrylic resin a bridged acryl-styrene copolymer resin, a bridged styrene resin and the like, and beads composed of glass, silica, alumina and the like) having a different refraction factor and acting as a light diffusion agent are dispersed, is preferably used as the light diffusion layers 23 and 24.

A lenticular lens group 23$a$, which extends in the vertical direction (up/down direction) when the transmission type screen 20 is used, is formed on the light source side surface of the light diffusion layer 23. The viewer side surface of the light diffusion layer 24 is composed of a smooth surface. External light absorbing portions (not shown) may be disposed on light non-outgoing portions of the light diffusion layer 24.

The viewer side surface of the light diffusion layer 24 disposed on the viewer side of the lenticular lens sheet 21 acting as the nearest-to-viewer side screen member is preferably composed of a smooth surface having a surface roughness Ra of 0 µm$\leq$Ra$\leq$0.5 µm, as well as the lenticular lens sheet 21 preferably has an amount of warping D of $-10$ mm$\leq$D$\leq$15 mm.

Figure 2:
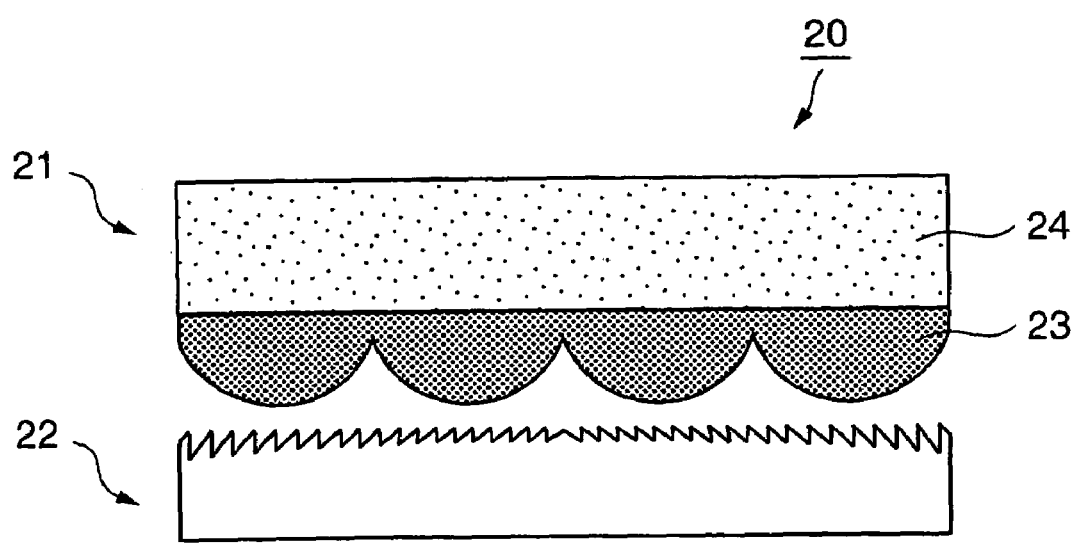
FIG. 2 is a schematic sectional view showing a first modified mode of the transmission type screen according to the embodiment of the present invention.

As a method of manufacturing the lenticular lens sheet 21, which has the light diffusion layers 23 and 24 arranged as described above, any arbitrary existing molding methods such as the multi-layer extrusion molding method, the cast molding method, the injection molding method, the press molding method, and the like can be employed. It is also possible to manufacture the light diffusion layers 23 and 24 by a different method and to form a single sheet by boding them to each other (in this case, external light absorbing portions can be formed on light non-outgoing portions of the light diffusion layer 23 before they are bonded to each other). However, the lenticular lens sheet 21 shown in FIG. 2 is located nearest to the viewer side among the screen members constituting the transmission type screen 20, and the light diffusion layer 24 is disposed on the viewer side surface of the transmission type screen 20. Accordingly, when the multi-layer extrusion molding method is used, the particle size of beads contained in the light diffusion layer 24 must be reduced or an additive amount of them must be reduced. This is because when the multi-layer extrusion molding method is used, the beads are projected from the surface of the light diffusion layer 24 after it is molded, and the surface roughness Ra of the viewer side surface of the light diffusion layer 24 is adversely affected by the beads. In contrast, when the cast molding method is used, since no bead are projected from the surface of the light diffusion layer 24 after it is molded, the particle size and the additive amount of the beads are not restricted.

(Second Modified Mode)

In the transmission type screen 10 shown in FIG. 1, the lenticular lens sheet 11 is used as the nearest-to-viewer side screen member. However, the lenticular lens sheet is not limited thereto, and, like a transmission type screen 30 shown in FIG. 3, another lenticular lens sheet 34 may be disposed on the viewer side of the a lenticular lens sheet 31 similar to the lenticular lens sheet 11, and the lenticular lens sheets 31 and 34 bonded to each other may be used as the nearest-to-viewer side screen member. In the transmission type screen 30 shown in FIG. 3, the lenticular lens sheets 31 and 34 are used together with a Fresnel lens sheet 32 disposed on the light source side of the transmission type screen 30.

The lenticular lens sheet 31 includes a clear layer 35 disposed on the light source side and a light diffusion layer 33 disposed on the viewer side. A transparent resin such as an acrylic resin, a vinyl chloride resin and the like is preferably used as the clear layer 35. A transparent resin such as an acrylic resin, a polyvinyl chloride resin and the like, in which beads (resin beads composed of a bridged acrylic resin, a bridged acryl-styrene copolymer resin, a bridged styrene resin and the like, and beads composed of glass, silica, alumina and the like) having a different refraction factor and acting as a light diffusion agent are dispersed, is preferably used as the light diffusion layer 33.

A lenticular lens group 35a is formed on the light source side surface of the clear layer 35. Further, a lenticular lens group 33a and convex portions 36 are formed on the viewer side surface of the light diffusion layer 33. Note that any of the lenticular lens groups 33a and 35a and the convex portions 36 are formed to extend in the vertical direction (up/down direction) when the transmission type screen 30 is used.

Of these components, the viewer side lenticular lens group 33a is formed on light outgoing portions, through which the image light condensed by the light source side lenticular lens group 35a is transmitted, of the viewer side surface of the lenticular lens sheet 31. The convex portions 36 are formed on light non-outgoing portions, through which the image light condensed by the light source side lenticular lens group 35a is not transmitted, of the surface of the viewer side surface of the lenticular lens sheet 31. Black external light absorbing portions 37 are formed on the convex portions 36.

In contrast, the lenticular lens sheet 34 has a light diffusion layer 39 which has a lenticular lens group 39' formed on the light source side thereof. The lenticular lens group 39' is formed to extend in a horizontal direction (right/left direction) when the transmission type screen 30 is used. A transparent resin such as an acrylic resin, a polyvinyl chloride resin and the like, in which beads (resin beads composed of a bridged acrylic resin, a bridged acryl-styrene copolymer resin, a bridged styrene resin and the like, and beads composed of glass, silica, alumina and the like) having a different refraction factor and acting as a light diffusion agent are dispersed, is preferably used as the light diffusion layer 39.

The lenticular lens sheets 31 and 34 described above were bonded to each other through an adhesive layer 38 formed on the external light absorbing portions 37 of the lenticular lens sheet 31, thereby a single nearest-to-viewer side screen member is arranged. A UV curing type adhesive and the like can be used as the adhesive layer 38. Further, the external light absorbing portions 37 may also achieve the function of the adhesive layer 38.

The viewer side surface of the light diffusion layer 39 disposed on the viewer side of the viewer side lenticular lens sheet 34 of the nearest-to-viewer side screen member (lenticular lens sheets 31 and 34) arranged as described above is preferably composed of a smooth surface having a surface roughness Ra of $0 \ \mu m \leq Ra \leq 0.5 \ \mu m$. Further, the nearest-to-viewer side screen member (lenticular lens sheets 31 and 34) preferably has an amount of warping D of $-10 \ mm \leq D \leq 15 \ mm$.

As a method of manufacturing the lenticular lens sheet 31, which has the light diffusion layer 33 and the clear layer 35 arranged as described above, any arbitrary existing molding methods such as the multi-layer extrusion molding method, the cast molding method, the injection molding method, the press molding method, and the like can be employed. The external light absorbing portions 37 can be formed on the convex portions 36 of the light diffusion layer 33 by various print methods (the screen print method, the gravure offset print), and the like. Further, as a method of manufacturing the lenticular lens sheet 34, which has the light diffusion layer 39 arranged as described above, any arbitrary existing molding methods such as the cast molding method, the injection molding method, the press molding method, and the like can be employed, in addition to the extrusion molding method, likewise the lenticular lens sheet 31. However, the lenticular lens sheet 34 is located nearest to the viewer side among the screen members constituting the transmission type screen 30, and the light diffusion layer 39 is disposed on the viewer side surface thereof. Accordingly, when the multi-layer extrusion molding method is used, the particle size of beads contained in the light diffusion layer 39 must be reduced or an additive amount of them must be reduced. In contrast, when the cast molding method is used, the particle size and the additive amount of the beads contained in the light diffusion layer 39 are not restricted.

(Third Modified Mode)

In the transmission type screen 10, the lenticular lens sheet 11 acting as the nearest-to-viewer side screen member is composed of the plurality of layers (light diffusion layer 13 and clear layers 14 and 15). However, the lenticular lens sheet 11 is not limited thereto, and, like a transmission type screen 40 shown in FIG. 4, a lenticular lens sheet 41 acting as the nearest-to-viewer side screen member may be composed of a single layer (light diffusion layer 43). In the transmission type screen 40 shown in FIG. 4, the lenticular lens sheet 41 is used together with a Fresnel lens sheet 42 disposed on the light source side.

The lenticular lens sheet 41 has a light diffusion layer 43 in which a lenticular lens group 43a is formed on the light source side surface thereof. The lenticular lens group 43a is formed on the light source side surface thereof is formed to extend in the vertical direction (up/down direction) when the transmission type screen 40 is used. External light absorbing portions (not shown) may be disposed on light non-outgoing portions of the light diffusion layer 43. A transparent resin such as an acrylic resin, a polyvinyl chloride resin and the like, in which beads (resin beads composed of a bridged acrylic resin, a bridged acryl-styrene copolymer resin, a bridged styrene resin and the like, and beads composed of glass, silica, alumina and the like) having a different refraction factor and acting as a light diffusion agent are dispersed, is preferably used as the light diffusion layer 43.

The viewer side surface of the light diffusion layer 43 disposed on the viewer side of the lenticular lens sheet 41 acting as the nearest-to-viewer side screen member is preferably composed of a smooth surface having a surface roughness Ra of $0\ \mu m \leq Ra \leq 0.5\ \mu m$, as well as the lenticular lens sheet 41 preferably has an amount of warping D of $-10\ mm \leq D \leq 15\ mm$.

As a method of manufacturing the lenticular lens sheet 41, which has the light diffusion layer 43 arranged as described above, any arbitrary existing molding methods such as the cast molding method, the injection molding method, the press molding method, and the like can be employed, in addition to the extrusion molding method. However, the lenticular lens sheet 41 is located nearest to the viewer side among the screen members constituting the transmission type screen 40, and the light diffusion layer 43 is disposed on the viewer side surface thereof. Accordingly, when the multi-layer extrusion molding method is used, the particle size of beads contained in the light diffusion layer 43 must be reduced or an additive amount of them must be reduced. In contrast, when the cast molding method is used, the particle size and the additive amount of the beads contained in the light diffusion layer 43 are not restricted.

(Fourth Modified Mode)

In the transmission type screen 10 show in FIG. 1, the transmission type screen is composed of the two screen members (lenticular lens sheet 11 and Fresnel lens sheet 12). However, the transmission type screen 10 is not limited thereto, and, like a transmission type screen 50 shown in FIG. 5, it may be composed of a lenticular lens sheet 51, a Fresnel lens sheet 52, and a prism lens sheet 57 interposed therebetween.

The lenticular lens sheet 51 includes a light diffusion layer 53 disposed on the light source side and a light diffusion layer 54 disposed on the viewer side. A lenticular lens group 53a, which extends in the vertical direction (up/down direction) when the transmission type screen 50 is used, is formed on the light source side surface of the light diffusion layer 53. The viewer side surface of the light diffusion layer 54 is composed of a smooth surface. External light absorbing portions (not shown) may be disposed on light non-outgoing portions of the light diffusion layer 54.

Since the basic arrangement, the material and the manufacturing method of the lenticular lens sheet 51 are approximately the same as those of the lenticular lens sheet 21 shown in FIG. 2, the detailed description of them is omitted here.

In contrast, the prism lens sheet 57 is composed of a prism lens group 56 formed on the viewer side surface of a transparent base 55, the prism lens group 56 being composed of a UV cure resin and the like. The prism lens group 56 is formed to extend in the horizontal direction (right/left direction) when the transmission type screen 50 is used.

In the transmission type screen 50 having the three screen members described above (lenticular lens sheet 51, prism lens sheet 57, and Fresnel lens sheet 52), the Fresnel lens sheet 52, which is located nearest to a light source, preferably has an amount of warping equal to or less than the amount of warping D of the lenticular lens sheet 51 acting as the nearest-to-viewer side screen member. With the above arrangement, the three screen members are urged in a direction where they come into intimate contact with each other, thereby occurrence of a double image due to floating of the screen members can be effectively prevented.

(Fifth Modified Mode)

In the transmission type screen 10 shown in FIG. 1, no optical function layer is formed on the viewer side surface of the lenticular lens sheet 11 acting as the nearest-to-viewer side screen member. However, the lenticular lens sheet 11 is not limited thereto, and, like a transmission type screen 60 shown in FIG. 6, a reflection preventing layer (an antireflection layer) 66 may be formed on the viewer side surface of a lenticular lens sheet 61 acting as a nearest-to-viewer side screen member. In the transmission type screen 60 shown in FIG. 6, the lenticular lens sheet 61 is used together with a Fresnel lens sheet 62 disposed on the light source side.

The lenticular lens sheet 61 includes a light diffusion layer 63 disposed on the light source side and a clear layer 65' disposed on the viewer side. A lenticular lens group 63a, which extends in the vertical direction (up/down direction) when the transmission type screen 60 is used, is formed on the light source side surface of the light diffusion layer 63. The viewer side surface of the clear layer 65 is composed of a smooth surface, and the reflection preventing layer 66 is formed on the smooth surface. External light absorbing portions (not shown) may be disposed on light non-outgoing portions of the light diffusion layer 66. A transparent resin such as an acrylic resin, a polyvinyl chloride resin and the like, in which beads (resin beads composed of a bridged acrylic resin, a bridged acryl-styrene copolymer resin, a bridged styrene resin and the like, and beads composed of glass, silica, alumina and the like) having a different refraction factor and acting as a light diffusion agent are dispersed, is preferably used as the light diffusion layer 63. Further, a transparent resin such as an acrylic resin, a vinyl chloride resin and the like is preferably used as the clear layer 65. Further, the reflection preventing layer 66 may be formed, for example, by laminating a high refraction factor layer composed of a UV cure resin and the like to a low diffraction factor layer composed of a fluoride organic compound and the like.

The viewer side surface of the reflection preventing layer 66 disposed on the viewer side of the lenticular lens sheet 61 acting as the nearest-to-viewer side screen member is preferably composed of a smooth surface having a surface roughness Ra of $0\ \mu m \leq Ra \leq 0.5\ \mu m$, as well as the lenticular lens sheet 61 preferably has an amount of warping D of $-10\ mm \leq D \leq 15\ mm$.

As a method of manufacturing the lenticular lens sheet 61, which has the light diffusion layer 63 and the clear layer 65 arranged as described above, any arbitrary existing methods such as the cast molding method, the injection molding method, the press molding method, and the like can be employed, in addition to the multi-layer extrusion molding method. It is also possible to manufacture the light diffusion layers 63 and the clear layer 65 by a different method and to form a single sheet by boding them to each other. The reflection preventing layer 66 may be formed on the clear layer 65, for example, by a method of forming the high refraction factor layer composed of the UV cure resin and the like by coating it, and then evaporating or coating a material for forming the low refraction factor layer on the above layer while controlling the film thickness of the material. When the low refraction factor layer is formed by evaporation and the like, a dielectric substance such as $MgF_2$, $SiO_2$, etc. can be used, and when it is formed by coating, a fluorine resin and the like can be used.

(Sixth Modified Mode)

In the modified modes described above, the lenticular lens sheets 11 to 61, the Fresnel lens sheets 12 to 62, and the like are used as the screen members constituting the transmission type screens 10 to 60 shown in FIGS. 1 to 6. However, any members may be used as the screen members as long as they realize various optical functions such as transmission, diffusion, condensing and the like of light, and any arbitrary screen members such as a fly eye lens sheet, a prism lens sheet, a diffusion sheet and the like may be used in place of the lenticular lens sheets 11 to 61 and the like acting as the nearest-to-viewer side screen members. Further, a sheet, which has a smooth surface (front surface sheet) and causes light to simply transmit therethrough, may be used in place of the lenticular lens sheets 11 to 61.

Figure 7A:
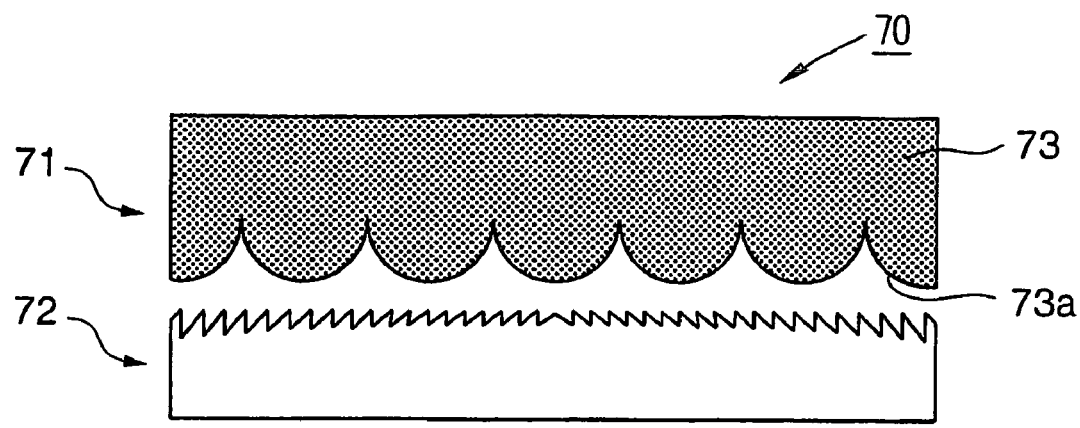
FIGS. 7A and 7B are schematic sectional views showing a sixth modified mode of the transmission type screen according to the embodiment of the present invention.
Figure 7B:
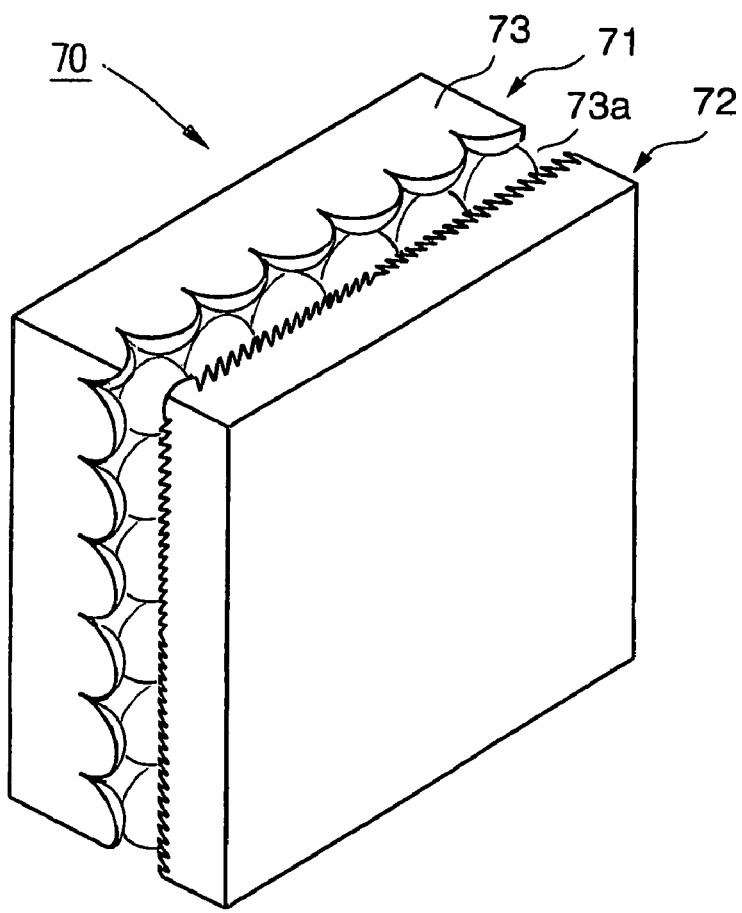

FIGS. 7A and 7B are views showing an example using a fly eye lens sheet as the nearest-to-viewer side screen member in the transmission type screen 10 shown in FIG. 1.

In a transmission type screen 70 shown in FIGS. 7A and 7B, the fly eye lens sheet 71 acting as the nearest-to-viewer side screen member is disposed on the viewer side surface of a Fresnel lens sheet 72.

The fly eye lens sheet 71 has a light diffusion layer 73 in which a fly eye lens group 73*a* is formed on the light source side surface thereof. External light absorbing portions (not shown) may be disposed on light non-outgoing portions of the light diffusion layer 73. A transparent resin such as an acrylic resin a polyvinyl chloride resin and the like, in which beads (resin beads composed of a bridged acrylic resin, a bridged acryl-styrene copolymer resin, a bridged styrene resin and the like, and beads composed of glass, silica, alumina and the like) having a different refraction factor and acting as a light diffusion agent are dispersed, is preferably used as the light diffusion layer 73.

It is preferable that the viewer side surface of the light diffusion layer 73 of the fly eye lens sheet 71 acting as the nearest-to-viewer side screen member be composed of a smooth surface having a surface roughness Ra of $0\ \mu m \leq Ra \leq 0.5\ \mu m$. In the fly eye lens sheet 71, it is preferable that the surface roughness Ra of at least light outgoing portions, through which image light is transmitted, of the viewer side surface of the light diffusion layer 73 be $0\ \mu m \leq Ra \leq 0.5\ \mu m$. However, the surface roughness Ra of the entire viewer side surface of the light diffusion layer 73 may be $0\ \mu m \leq Ra \leq 0.5\ \mu m$. Further, it is preferable that the fly eye lens sheet 71 have an amount of warping D of $-10\ mm \leq D \leq 15\ mm$.

As a method of manufacturing the fly eye lens sheet 71, which has the light diffusion layer 73 arranged as described above, any arbitrary existing molding methods such as the cast molding method, the injection molding method, the press molding method, and the like can be employed, in addition to the extrusion molding method. However, the fly eye lens sheet 71 is located nearest to the viewer side among the screen members constituting the transmission type screen 70, and the light diffusion layer 73 is disposed on the viewer side surface thereof. Accordingly, when the extrusion molding method is used, the particle size of beads contained in the light diffusion layer 73 must be reduced or an additive amount of them must be reduced. In contrast, when the cast molding method is used, the particle size and the additive amount of the beads contained in the light diffusion layer 73 are not restricted.

(Seventh Modified Mode)

In the transmission type screen 70 shown in FIGS. 7A and 7B, the fly eye lens sheet 71 is used as the nearest-to-viewer side screen member. However, the nearest-to-viewer side screen member is not limited thereto, and, like a transmission type screen 80 shown in FIG. 8, a diffusion sheet 84 may be disposed on the viewer side of a fly eye lens sheet 81 and bonded to the fly eye lens sheet 81, and the thus bonded diffusion sheet 84 and the fly eye lens sheet 81 may be used as the nearest-to-viewer side screen member. In the transmission type screen 80 shown in FIG. 8, the fly eye lens sheet 81 and the diffusion sheet 84 are used together with a Fresnel lens sheet 82 disposed on the light source side.

The fly eye lens sheet 81 has a light diffusion layer 83 which has a fly eye lens group 83*a* formed on the light source side surface thereof as well as has a fly eye lens group 83*b* and concave portions 86 formed on the viewer side surface thereof. A transparent resin such as an acrylic resin, a polyvinyl chloride resin and the like, in which beads (resin beads composed of a bridged acrylic resin, a bridged acryl-styrene copolymer resin, a bridged styrene resin and the like, and beads composed of glass, silica, alumina and the like) having a different refraction factor and acting as a light diffusion agent are dispersed, is preferably used as the light diffusion layer 83.

Of these components, the viewer side fly eye lens group 83*b* is formed on the light outgoing portions, through which the image light condensed by the light source side fly eye lens group 83*a* is transmitted, of the viewer side surface of the fly eye lens sheet 81. Further, the convex portions 86 are formed on the light non-outgoing portions, through which the image light condensed by the light source side fly eye lens group 83*a* is not transmitted, of the viewer side surface of the fly eye lens sheet 81. Black external light absorbing portions 87 are formed on the convex portions 86.

In contrast, the diffusion sheet 84 has a sheet-shaped light diffusion layer 89. A transparent resin such as an acrylic resin, a polyvinyl chloride resin and the like, in which beads (resin beads composed of a bridged acrylic resin a bridged acryl-styrene copolymer resin, a bridged styrene resin and the like, and beads composed of glass, silica, alumina and the like) having a different refraction factor and acting as a light diffusion agent are dispersed, is preferably used as the light diffusion layer 89.

The two sheets, that is, the fly eye lens sheet 81 and the diffusion sheet 84 described above are bonded to each other through an adhesive layer 88 formed on the external light absorbing portions 87 of the fly eye lens sheet 81, thereby the single nearest-to-viewer side screen member is arranged. A UV curing type adhesive and the like can be used as the adhesive layer 88. Further, the external light absorbing portions 87 may also achieve the function of the adhesive layer 88.

It is preferable that the viewer side surface of the light diffusion layer 89 of the viewer side diffusion sheet 84 of the nearest-to-viewer side screen member arranged as described above be composed of a smooth surface having a surface roughness Ra of $0 \ \mu m \leqq Ra \leqq 0.5 \ \mu m$. Further, the nearest-to-viewer side screen member (fly eye lens sheet 81 and diffusion sheet 84) preferably has an amount of warping D of $-10 \ mm \leqq D \leqq 15 \ mm$.

As a method of manufacturing the fly eye lens sheet 81, which has the light diffusion layer 83 arranged as described above, any arbitrary existing molding methods such as the extrusion molding method, the cast molding method, the injection molding method, the press molding method, and the like can be employed. The external light absorbing portions 87 can be formed on the convex portions 86 of the light diffusion layer 83 using various print methods (screen print method, gravure offset print), and the like.

Further, as a method of manufacturing the diffusion sheet 84, which has the light diffusion layer 89 arranged as described above, any arbitrary existing molding methods such as the cast molding method, the injection molding method, the press molding method, and the like can be employed, in addition to the extrusion molding method, likewise the fly eye lens sheet 81. However, the diffusion sheet 84 is located nearest to the viewer side among the screen members constituting the transmission type screen 80, and the light diffusion layer 89 is disposed on the viewer side surface thereof. Accordingly, when the extrusion molding method is used, the particle size of beads contained in the light diffusion layer 89 must be reduced or an additive amount of them must be reduced. In contrast, when the cast molding methods is used, the particle size and the additive amount of the beads contained in the light diffusion layer 89 are not restricted.

It should be noted that, in the transmission type screens 10 to 80 shown in FIGS. 1 to 8, the light diffusion layers included in the lenticular lens sheets 11 to 61, the light diffusion layers included in the fly eye lens sheets 71, 81 and the like are not always dispensable components and may be suitably replaced with clear layers and the like which contain no light diffusion agent.

EXAMPLES

Next, specific examples of the embodiments described above will be described.

Example 1

A transmission type screen corresponding to that shown in FIG. 1 was manufactured as a transmission type screen according to example 1.

Specifically, a 52-inch double-sided lenticular lens sheet having a light diffusion layer as an intermediate layer as well as clear layers on the front and back surfaces thereof was manufactured by the multi-layer extrusion molding method. The light diffusion layer was composed of an acrylic resin (refraction factor: 1.49) as a base member which contained therein, as a light diffusion agent, 2 wt % of beads composed of a spherical bridged acryl-styrene copolymer resin having an average particle size of 20 µm and a refraction factor of 1.51 as well as 3.5 wt % of spherical bridged styrene beads having an average particle size of 9 µm and a refraction factor of 1.59. The front and back clear layers were composed of a transparent acrylic resin, and lenticular lens groups extending in a vertical direction were formed on the light source side and viewer side surfaces thereof. The lenticular lenses formed on the light source side surface had a pitch set to 1.0 mm. Lenticular lenses each having a width of 0.6 mm were formed on light outgoing portions, through which image light is transmitted, of the viewer side surface, convex portions each having a width of 0.4 mm were formed on light non-outgoing portions (located between the lenticular lenses) through which no image light was transmitted, and further black external light absorbing portions were formed on the convex portions by the screen print method.

The 52-inch transmission type screen was assembled by further disposing a Fresnel lens sheet having the same size as the thus manufactured lenticular lens sheet on the light source side thereof.

In the transmission type screen assembled as described above, when the surface roughness Ra of the light outgoing portions (lenticular lens portions), through which the image light is transmitted, of the viewer side surface of the lenticular lens sheet was measured, the surface roughness Ra thereof was 0.02 µm. Further, when the amount of warping D of the lenticular lens sheet was measured according to a measuring method shown in FIGS. 9 to 11, it was 7 mm.

When a three-tube type CRT was used as a light source for the transmission type screen described above and an image displayed on the transmission type screen was evaluated visually, there could be obtained an image having a glossy feeling with a small amount of glare distortion. Further, a good contrast could be obtained by the external light absorbing portions of the double-sided lenticular lens sheet constituting the transmission type screen, and further an excellent image with a weak color shift could be obtained by the viewer side lenticular lens group of the double-sided lenticular lens sheet.

Example 2-1

A transmission type screen corresponding to that shown in FIG. 2 was manufactured as a transmission type screen according to example 2-1.

Specifically, a 60-inch single-sided lenticular lens sheet, which had light diffusion layers on the viewer side and on the light source side, respectively, was manufactured by the multi-layer extrusion molding method. The viewer-side light diffusion layer was composed of an acrylic resin (refraction factor: 1.49) as a base member which contained therein, as a light diffusion agent, 0.4 wt % of beads composed of a spherical bridged acryl-styrene copolymer resin having an average particle size of 5 µm and a refraction factor of 1.51. Further, the light source side light diffusion layer was composed of an acrylic resin (refraction factor: 1.49) as a base member which contained therein, as a light diffusion agent, 5.5 wt % of spherical bridged styrene beads having an average particle size of 9 µm and a refraction factor of 1.59. A lenticular lens group, which extended in the vertical direction at a pitch of 0.15 mm, was formed on the light source side surface of the light source side light diffusion layer.

The 60-inch transmission type screen was assembled by further disposing a Fresnel lens sheet having the same size as the thus manufactured lenticular lens sheet on the light source side thereof.

In the transmission type screen assembled as described above, when the surface roughness Ra of the viewer side surface of the lenticular lens sheet was measured, the surface roughness Ra was 0.13 µm. Further, when the amount of warping D of the lenticular lens sheet was measured according to the measuring method shown in FIGS. 9 to 11, it was 8 mm.

When an LCD projector was used as a light source for the transmission type screen described above and an image displayed on the transmission type screen was evaluated visually, there could be obtained an image having a glossy feeling with a small amount of glare distortion.

Example 2-2

Figure 4:
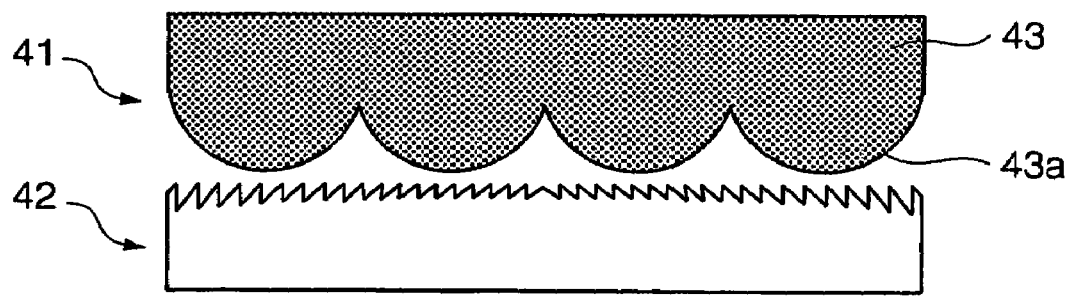
FIG. 4 is a schematic sectional view showing a third modified mode of the transmission type screen according to the embodiment of the present invention.

A transmission type screen corresponding to that shown in FIG. 4 was manufactured as a transmission type screen according to example 2-2.

Specifically, a 60-inch single-sided lenticular lens sheet having a light diffusion layer was manufactured by the cast molding method. The light diffusion layer was composed of an acrylic resin (refraction factor: 1.49) as a base member which contained therein, as a light diffusion agent, 2.5 wt % of beads composed of a spherical bridged acryl-styrene copolymer resin having an average particle size of 13 µm and a refraction factor of 1.53 as well as 5 wt % of spherical bridged styrene beads having an average particle size of 9 µm and a refraction factor of 1.59. A lenticular lens group, which extended in the vertical direction at a pitch of 0.15 mm, was formed on the light source side surface of the light diffusion layer.

The 60-inch transmission type screen was assembled by further disposing a Fresnel lens sheet having the same size as the thus manufactured lenticular lens sheet on the light source side thereof.

In the transmission type screen assembled as described above, when the surface roughness Ra of the viewer side surface of the lenticular lens sheet was measured, the surface roughness Ra was 0.06 µm. Further, when the amount of warping D of the lenticular lens sheet was measured according to the measuring method shown in FIGS. 9 to 11, it was 8 mm.

When an LCD projector was used as a light source for the transmission type screen described above and an image displayed on the transmission type screen was evaluated visually, there could be obtained an image having a glossy feeling with a small amount of glare distortion.

Example 3

Figure 3:
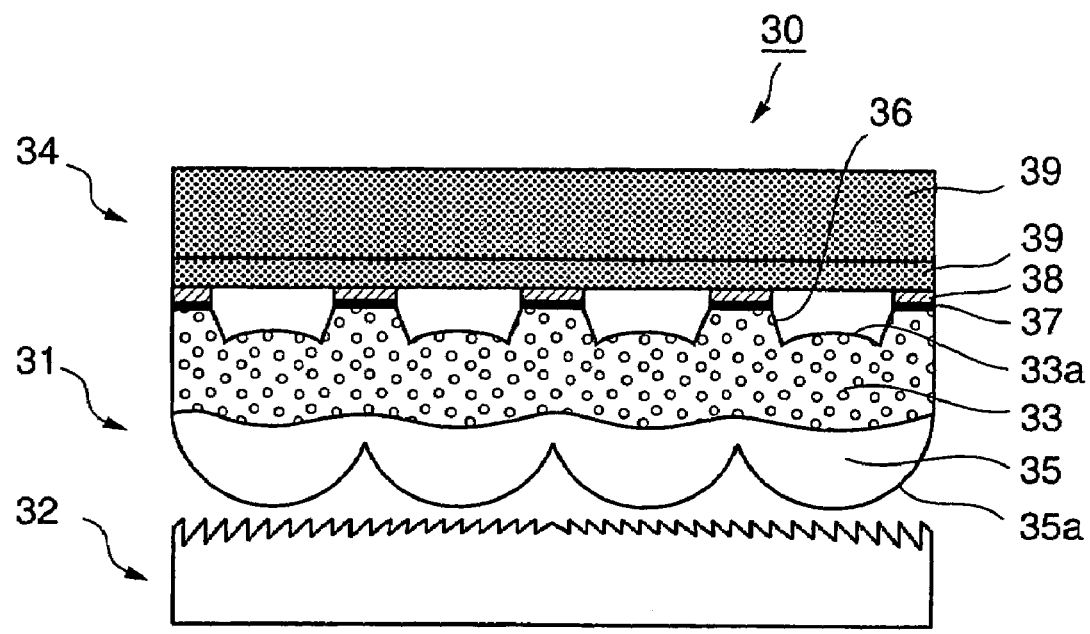
FIG. 3 is a schematic sectional view showing a second modified mode of the transmission type screen according to the embodiment of the present invention.

A transmission type screen corresponding to that shown in FIG. 3 was manufactured as a transmission type screen according to example 3.

Specifically, a 50-inch single-sided lenticular lens sheet having a light diffusion layer was manufactured by the cast molding method. The light diffusion layer was composed of an acrylic resin (refraction factor: 1.49) as a base member which contained therein, as a light diffusion agent, 1.3 wt % of beads composed of a spherical bridged acryl-styrene copolymer resin having an average particle size of 35 µm and a refraction factor of 1.55. A lenticular lens group, which extended in the vertical direction at a pitch of 0.1 mm, was formed on the light source side surface of the light diffusion layer.

Further, a 50-inch double-sided lenticular lens sheet having a light diffusion layer on the viewer side as well as a clear layer on the light source side was manufactured by the multi-layer extrusion molding method. The light source side clear layer was composed of a transparent acrylic resin, and a lenticular lens group extending in the vertical direction was formed on the light source side surface of the clear layer. The viewer side light diffusion layer was composed of an acrylic resin (refraction factor: 1.49) as a base member which contained therein, as a light diffusion agent, 1 wt % of beads composed of a spherical bridged acryl-styrene copolymer resin having an average particle size of 10 µm and a refraction factor of 1.51 as well as 2.5 wt % of spherical bridged styrene beads having an average particle size of 9 µm and a refraction factor of 1.59. A lenticular lens group extending in the vertical direction was formed on the viewer side surface of the light diffusion layer. The lenticular lens formed on the light source side surface had a pitch set to 0.5 mm. Lenticular lenses each having a width of 0.27 mm were formed on light outgoing portions, through which image light is transmitted, of the viewer side surface, convex portions each having a width of 0.23 mm were formed on light non-outgoing portions (located between the lenticular lenses) through which no image light was transmitted, and further black external light absorbing portions were formed on the convex portions by the screen print method.

Thereafter, the two lenticular lens sheets (the single-sided lenticular lens sheet and the double-sided lenticular lens sheet) were bonded to each other through an adhesive layer formed on the external light absorbing portions of the double-sided lenticular lens sheet, thereby a single nearest-to-viewer side screen member was manufactured.

A 50-inch transmission type screen was assembled by further disposing a Fresnel lens sheet having the same size as the thus manufactured nearest-to-viewer side screen member on the light source side thereof.

In the transmission type screen assembled as described above, when the surface roughness Ra of the surface of the light diffusion layer disposed on the viewer side of the viewer side single-sided lenticular lens sheet of the two lenticular lens sheets constituting the nearest-to-viewer side screen member, the surface roughness Ra was 0 µm. Further, when the amount of warping D of the lenticular lens sheet was measured according to the measuring method shown in FIGS. 9 to 11, it was 5 mm.

When a three-tube type CRT was used as a light source for the transmission type screen described above and an image displayed on the transmission type screen was evaluated visually, there could be obtained an image having a glossy feeling with a small amount of glare distortion. Further, a good contrast could be obtained by the external light absorbing portions of the double-sided lenticular lens sheet constituting the transmission type screen, and further an excellent image with a weak color shift could be obtained by the viewer side lenticular lens group of the double-sided lenticular lens sheet.

Example 4

A transmission type screen corresponding to that shown in FIGS. 7A and 7B was manufactured as a transmission type screen according to example 4.

Specifically, a 56-inch fly eye lens sheet having a light diffusion layer was manufactured by the cast molding method. The light diffusion layer used was composed of an acrylic resin (refraction factor: 1.49) as a base member which contained therein, as a light diffusion agent, 3 wt % of spherical bridged styrene beads having an average particle size of 10 µm and a refraction factor of 1.59. A fly eye lens group having a radius of 0.12 mm was formed on the light source side surface of the light diffusion layer.

The 56-inch transmission type screen was assembled by further disposing a Fresnel lens having the same size as the thus manufactured fly eye lens sheet on the light source side thereof.

In the transmission type screen assembled as described above, when the surface roughness Ra of the viewer side surface of the fly eye lens was measured, the surface roughness Ra was 0 µm. Further, when the amount of warping D of the fly eye lens was measured according to the measuring method shown in FIGS. 9 to 11, it was 8 mm.

When a DLP projector was used as a light source for the transmission type screen described above and an image displayed on the transmission type screen was evaluated visually, there could be obtained an image having a glossy feeling with a small amount of glare distortion.

Example 5

Figure 5:
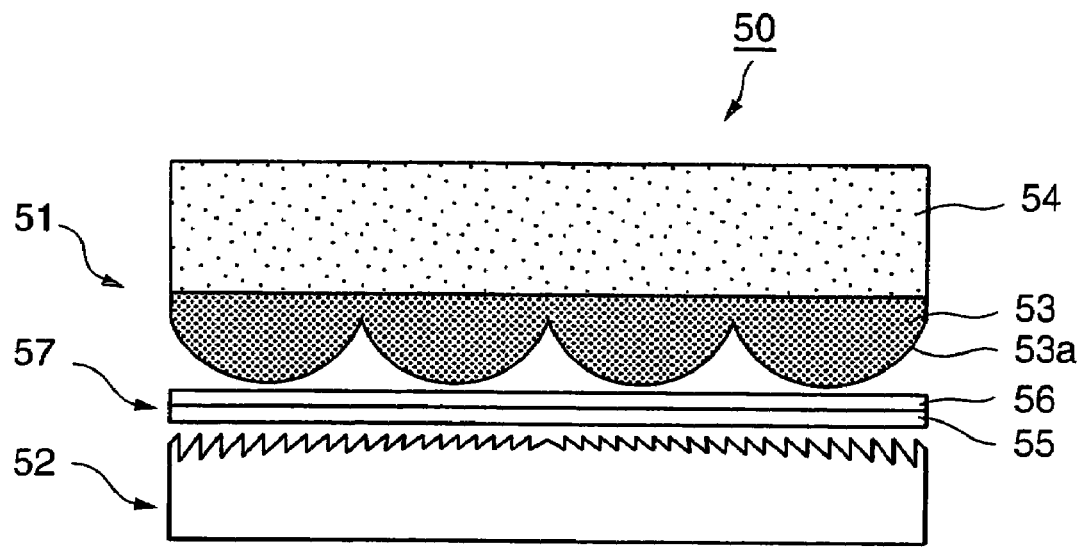
FIG. 5 is a schematic sectional view showing a fourth modified mode of the transmission type screen according to the embodiment of the present invention.

A transmission type screen corresponding to that shown in FIG. 5 was manufactured as a transmission type screen according to example 5.

Specifically, a 55-inch single-sided lenticular lens sheet having light diffusion layers on the viewer side and on the light source side, respectively was manufactured by the multi-layer extrusion molding method. The viewer side light diffusion layer was composed an acrylic resin (refraction factor: 1.49) which contained therein, as a light diffusion agent 0.4 wt % of beads composed of a spherical bridged acryl-styrene copolymer resin having an average particle size of 5 µm and a refraction factor of 1.51. Further, the light source side light diffusion layer was composed of an acrylic resin (refraction factor: 1.49) which contained therein, as a light diffusion agent, 4.5 wt % of spherical bridged styrene beads having an average particle size of 9 µm and a refraction factor of 1.59. A lenticular lens group, which extended in the vertical direction at a pitch of 0.14 mm, was formed on the light source side surface of the light source side light diffusion layer.

Further, a 55-inch prism lens sheet was manufactured by forming a prism lens group composed of a UV curing resin on a transparent film base member. Note that the prism lens group was formed on the light source side surface of the transparent film base member as a lens group extending in a horizontal direction at a pitch of 0.1 mm.

Figure 9:
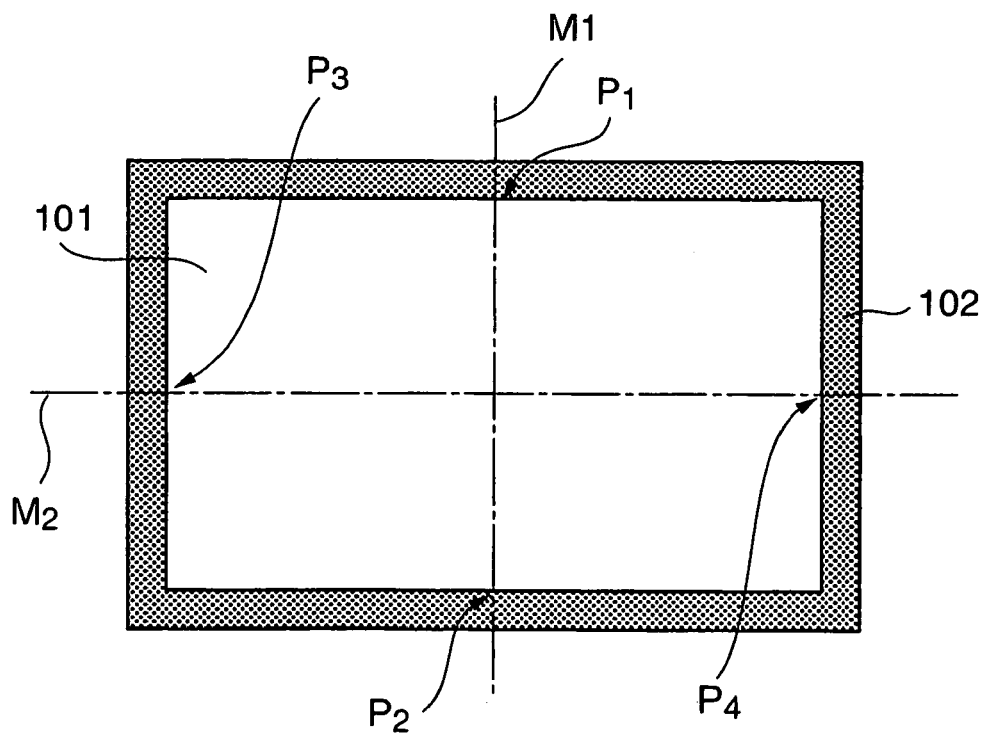
FIG. 9 is a front elevational view showing a state in which a screen member used as a component of the transmission type screen is set to a TV frame.
Figure 10:
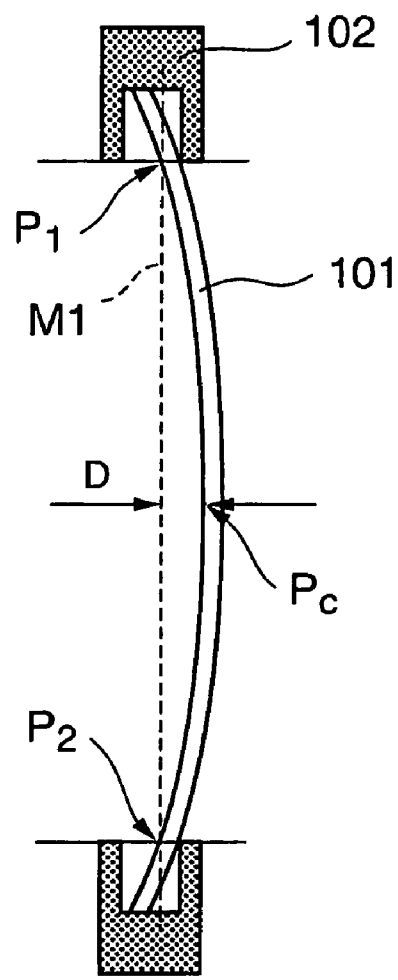
FIG. 10 is a view explaining an amount of warping D of the screen member shown in FIG. 9.
Figure 11:
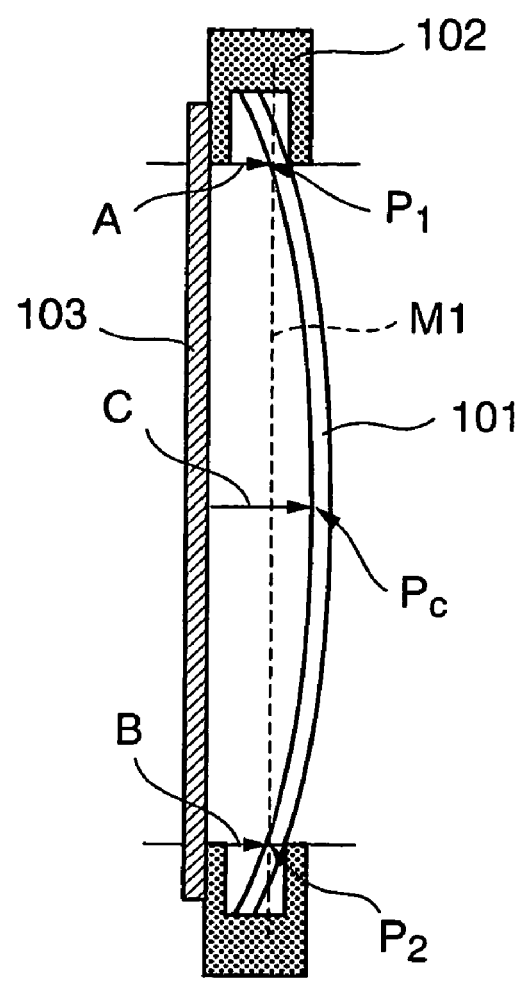
FIG. 11 is a view explaining a method of measuring the amount of warping D of the screen member shown in FIG. 9.

When the amount of warping D of the single-sided lenticular lens sheet manufactured as described above was measured according to the measuring method shown in FIGS. 9 to 11, it was 8 mm. Further, when the amount of warping D of the prism lens sheet was measured according to the measuring method shown in FIGS. 9 to 11, it was 0 mm.

The lenticular lens sheet and the prism lens sheet manufactured as described above were disposed in this order from the viewer side, and the 55-inch transmission type screen was assembled by further disposing a Fresnel lens sheet having the same size as the prism lens sheet on the light source side of the prism lens sheet. When the amount of warping D of the Fresnel lens sheet used here was measured according to the measuring method shown in FIGS. 9 to 11, it was 4 mm.

In the transmission type screen assembled as described above, when the surface roughness Ra of the viewer side surface of the lenticular lens sheet was measured, the surface roughness Ra was 0.13 µm. Further, when the overall amount of warping D of the three screen members (lenticular lens sheet, prism lens sheet, and Fresnel lens sheet) was measured according to the measuring method shown in FIGS. 9 to 11, it was 6 mm.

When a DLP projector was used as a light source for the transmission type screen described above and an image displayed on the transmission type screen was evaluated visually, there could be obtained an image having a glossy feeling with a small amount of glare distortion. Since the three screen members (lenticular lens sheet, prism lens sheet, and Fresnel lens sheet) were arranged integrally with each other, no double image due to floating of the screen members was observed.

Example 6

Figure 6:
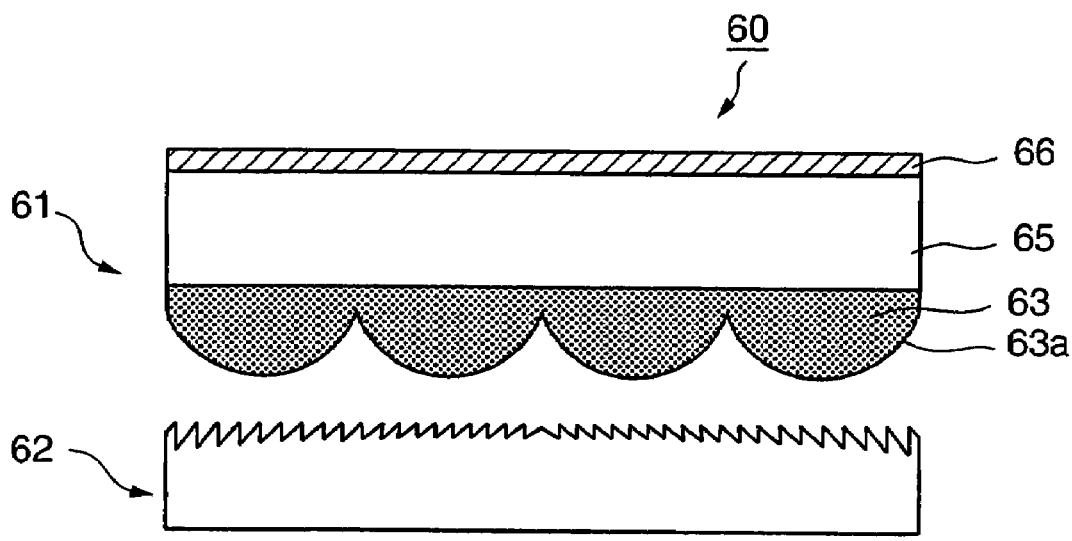
FIG. 6 is a schematic sectional view showing a fifth modified mode of the transmission type screen according to the embodiment of the present invention.

A transmission type screen corresponding to that shown in FIG. 6 was manufactured as a transmission type screen according to example 6.

Specifically, a 60-inch single-sided lenticular lens sheet 61, which had a clear layer on the viewer side as well as a light diffusion layer on the light source side, was manufactured by the multi-layer extrusion molding method. The viewer side clear layer was composed of a transparent acrylic resin (refraction factor: 1.49). Further, the light source side light diffusion layer was composed of an acrylic resin (refraction factor: 1.49) as a base member which contained therein, as a light diffusion agent, 4.5 wt % of spherical bridged styrene beads having an average particle size of 9 µm and a refraction factor of 1.59. A lenticular lens group extending in the vertical direction at a pitch of 0.14 mm was formed on the light source side surface of the light source side light diffusion layer. Further, a reflection preventing layer, which was formed by laminating a high refraction factor layer composed of a UV cure resin on a low refraction factor layer composed of a fluorine organic compound, was formed on the viewer side surface of the clear layer.

The 60-inch transmission type screen was assembled by further disposing a Fresnel lens sheet having the same size as the thus manufactured lenticular lens sheet on the light source side thereof.

In the transmission type screen assembled as described above, when the surface roughness Ra of the viewer side surface (surface of the reflection preventing layer) of the lenticular lens sheet was measured, the surface roughness Ra was 0.13 µm. Further, when the amount of warping D of the lenticular lens sheet was measured according to the measuring method shown in FIGS. 9 to 11, it was 8 mm.

When an LCD projector was used as a light source for the transmission type screen described above and an image displayed on the transmission type screen was evaluated visually, there could be obtained an image having a glossy feeling with a small amount of glare distortion.

Example 7

Figure 8:
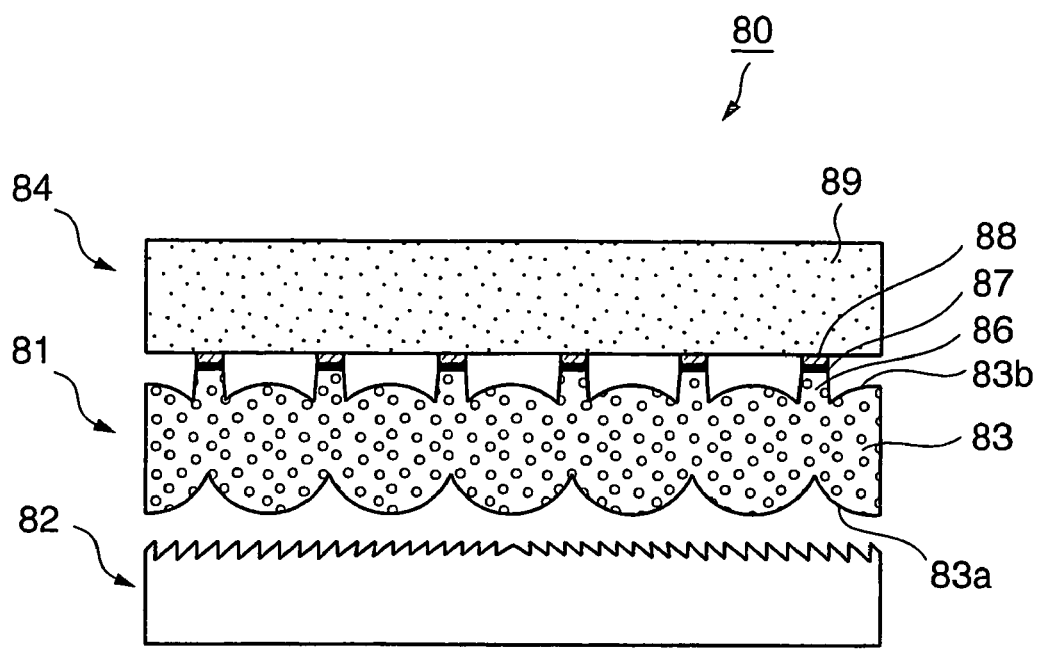
FIG. 8 is a schematic sectional view showing a seventh modified mode of the transmission type screen according to the embodiment of the present invention.

A transmission type screen corresponding to that shown in FIG. 8 was manufactured as a transmission type screen according to example 7.

Specifically, a 56-inch diffusion sheet having a light diffusion layer was manufactured by the cast molding method. The light diffusion layer was composed of an acrylic resin (refraction factor: 1.49) as a base member which contained therein, as a light diffusion agent, 1 wt % of spherical bridged styrene beads having an average particle size of 10 µm and a refraction factor of 1.59.

Further, a 56-inch double-sided fly eye lens sheet having the light diffusion layer was manufactured by a heat press method. The light diffusion layer had a fly eye lens group formed on the light source side surface thereof as well as had a fly eye lens group and convex portions formed on the viewer side surface thereof. The light diffusion layer was composed of an acrylic resin (refraction factor: 1.49) as a base member which contained therein, as a light diffusion agent, 2.5 wt % of beads composed of a spherical bridged acryl-styrene copolymer resin having an average particle size of 10 μm and a refraction factor of 1.55. The fly eye lenses formed on the light source side surface had a radius of 0.5 mm. Further, fly eye lenses each having a radius of 0.3 mm were formed on light outgoing portions, through which image light is transmitted, of the viewer side surface, convex portions were formed on light non-outgoing portions (located between the fly eye lenses), through which no image light was transmitted, of the viewer side surface, and further black external light absorbing portions were formed on the convex portions by the gravure offset method.

Thereafter, the two screen sheets (diffusion sheet and double-sided fly eye lens sheet) described above were bonded to each other through an adhesive layer formed on the external light absorbing portions of the double-sided fly eye lens sheet, thereby a single nearest-to-viewer side screen member was manufactured.

The 56-inch transmission type screen was assembled by further disposing a Fresnel lens sheet having the same size as the thus manufactured nearest-to-viewer side screen member on the light source side thereof.

In the transmission type screen assembled as described above, when the surface roughness Ra of the surface of the viewer side light diffusion layer of the two screen members constituting the nearest-to-viewer side screen member was measured, the surface roughness Ra was 0 μm. Further, the amount of warping D of the diffusion sheet and the double-sided fly eye lens sheet acting as the nearest-to-viewer side screen member was measured according to the measuring method shown in FIGS. 9 to 11, it was 6 mm.

When a three-tube type CRT was used as a light source for the transmission type screen described above and an image displayed on the transmission type screen was evaluated visually, there could be obtained an image having a glossy feeling with a small amount of glare distortion. Further, a good contrast could be obtained by the external light absorbing portions of the double-sided fly eye lens sheet constituting the transmission type screen, and further an excellent image with a weak color shift could be obtained by the viewer side fly eye lens group of the double-sided fly eye lens sheet.

Comparative Example 1

A transmission type screen according to comparative example 1 was approximately the same as the transmission type screen according to example 1, except that a lenticular lens sheet acting as a nearest-to-viewer side screen member was composed of two layers, and the layer located on the viewer side was a light diffusion layer.

Specifically, a 52-inch double-sided lenticular lens sheet having a light diffusion layer on the viewer side as well as a clear layer on the light source side was manufactured by a two-layer extrusion method. The light source side clear layer was composed of a transparent acrylic resin, and a lenticular lens group extending in the vertical direction was formed on the light source side surface of the clear layer. The viewer side light diffusion layer was composed of an acrylic resin (refraction factor: 1.49) as a base member which contained therein, as a light diffusion agent, 2 wt % of beads composed of a spherical bridged acryl-styrene copolymer resin having an average particle size of 20 μm and a refraction factor of 1.51 as well as 3.5 wt % of spherical bridged styrene beads having an average particle size of 9 μm and a refraction factor of 1.59. A lenticular lens group extending in the vertical direction was formed on the viewer side surface of the light diffusion layer. The lenticular lens formed on the light source side surface had a pitch of 1.0 mm. Lenticular lenses each having a width of 0.6 mm were formed on light outgoing portions, through which image light was transmitted, of the viewer side surface, convex portions each having a width of 0.4 mm were formed on light non-outgoing portions (located between the lenticular lenses) through which no image light was transmitted, and further black external light absorbing portions were formed on the convex portions by the screen print method.

The 52-inch transmission type screen was assembled by further disposing a Fresnel lens sheet having the same size as the thus manufactured lenticular lens sheet on the light source side thereof.

In the transmission type screen assembled as described above, when the surface roughness Ra of the surface of the light outgoing portions (lenticular lens portion), through which the image light was transmitted, of the viewer side surface of the lenticular lens sheet was measured, the surface roughness Ra of the light outgoing portions was 1.1 μm. Further, when the amount of warping D of the lenticular lens sheet was measured according to the measuring method shown in FIGS. 9 to 11, it was 7 mm.

When a three-tube type CRT was used as a light source of the transmission type screen described above and an image displayed on the transmission type screen was evaluated visually, there was obtained a white-tinged brown image without a glossy feeling was obtained while it had a small amount of glare distortion.

Comparative Example 2

A transmission type screen according to comparative example 2 was approximately the same as the transmission type screen according to example 2-1, except that a lenticular lens sheet acting as a nearest-to-viewer side screen member was greatly warped in an inverse direction.

Specifically, a 60-inch single-sided lenticular lens sheet having light diffusion layers on the viewer side and on the light source side, respectively was manufactured by the multi-layer extrusion molding method. The viewer side light diffusion layer was composed of an acrylic resin (refraction factor: 1.49) as a base member which contained therein, as a light diffusion agent, 0.4 wt % of beads composed of a spherical bridged acryl-styrene copolymer resin having an average particle size of 10 μm and a refraction factor of 1.51. Further, the light source side light diffusion layer was composed of an acrylic resin (refraction factor: 1.49) as a base member which contained therein, as a light diffusion agent, 5.5 wt % of spherical bridged styrene beads having an average particle size of 9 μm and a refraction factor of 1.59. A lenticular lens group extending in the vertical direction at a pitch of 0.14 mm was formed on the light source side surface of the light source side light diffusion layer.

The 60-inch transmission type screen was assembled by further disposing a Fresnel lens sheet having the same size as the thus manufactured lenticular lens sheet on the light source side thereof.

In the transmission type screen assembled as described above, when the surface roughness Ra of the viewer side surface of the lenticular lens sheet was measured, the surface roughness Ra was 0.13 μm. Further, when the amount of warping D of the lenticular lens sheet was measured according to the measuring method shown in FIGS. 9 to 11, it was −14 mm.

When an LCD projector was used as a light source for the transmission type screen described above and an image displayed on the transmission type screen was evaluated visually, glare was greatly distorted although the image had a glossy feeling, thereby observation of the image was greatly disturbed.

Comparative Example 3

A transmission type screen according to comparative example 3 was approximately the same as the transmission type screen according to example 3, except that a lenticular lens sheet acting as a nearest-to-viewer side screen member was formed by the extrusion molding method in place of the cast molding method.

Specifically, a 50-inch single-sided lenticular lens sheet having a light diffusion layer was manufactured by the extrusion molding method. The light diffusion layer was composed of an acrylic resin (refraction factor: 1.49) as a base member which contained therein, as a light diffusion agent, 1.3 wt % of beads composed of a spherical bridged acryl-styrene copolymer resin having an average particle size of 35 μm and a refraction factor of 1.55. A lenticular lens group extending in the horizontal direction at a pitch of 0.1 mm was formed on the light source side surface of the light diffusion layer.

Further, a 50-inch double-sided lenticular lens sheet having a light diffusion layer on the viewer side as well as a clear layer on the light source side was manufactured by the multi-layer extrusion molding method. The light source side clear layer was composed of a transparent acrylic resin, and a lenticular lens group extending in the vertical direction was formed on the light source side surface of the clear layer. The viewer side light diffusion layer was composed of an acrylic resin (refraction factor: 1.49) as a base member which contained therein, as a light diffusion agent, 1 wt % of beads composed of a spherical bridged acryl-styrene copolymer resin having an average particle size of 10 μm and a refraction factor of 1.51 as well as 5.5 wt % of spherical bridged styrene beads having an average particle size of 9 μm and a refraction factor of 1.59. A lenticular lens group extending in the vertical direction was formed on the viewer side surface of the light diffusion layer. The lenticular lens formed on the light source side surface had a pitch of 0.5 mm. Lenticular lenses each having a width of 0.27 mm were formed on light outgoing portions, through which image light was transmitted, of the viewer side surface, convex portions each having a width of 0.23 mm were formed on light non-outgoing portions (located between the lenticular lenses) through which no image light was transmitted, and further black external light absorbing portions were formed on the convex portions by the screen print method.

Thereafter, the two lenticular lens sheets (single-sided lenticular lens sheet and double-sided lenticular lens sheet) were bonded to each other through an adhesive layer formed on the external light absorbing portions of the double-sided lenticular lens sheet, thereby a single nearest-to-viewer side screen member was manufactured.

The 50-inch transmission type screen was assembled by further disposing a Fresnel lens sheet having the same size as the thus manufactured nearest-to-viewer side screen member on the light source side thereof.

In the transmission type screen assembled as described above, when the surface roughness Ra of the surface of the light diffusion layer disposed on the viewer side of the viewer side single-sided lenticular lens sheet of the two lenticular lens sheets constituting the nearest-to-viewer side screen member, the surface roughness Ra was 2.6 μm. Further, when the amount of warping D of the lenticular lens sheets was measured according to the measuring method shown in FIGS. 9 to 11, it was 23 mm.

When a three-tube type CRT was used as a light source for the transmission type screen described above and an image displayed on the transmission type screen was evaluated visually, it was greatly disturbed to observe the image because glare distortion was greatly outstanding while glare was obscure, and further the image was white-tinged brown without a glossy feeling.

The invention claimed is:

1. A transmission type screen comprising a plurality of screen members combined with each other to realize various optical functions of light and a frame holding the screen members, characterized in that a smooth surface having a surface roughness Ra of $0\ \mu m \leq Ra \leq 0.5\ \mu m$ is formed on a viewer side surface of a nearest-to-viewer side screen member, which is located nearest to a viewer side, of the plurality of screen members, and in that the screen members are held by the frame such that an amount of warping D of the nearest-to-viewer side screen member is $-10\ mm \leq D \leq 15\ mm$ wherein $D=(A+B)/2-C$, A and B are distances from a measurement reference line to upper and lower side centers of the nearest-to-viewer side screen member, and C is a distance from the measurement reference line to the center of the nearest-to-viewer side screen member.

2. A transmission type screen according to claim 1, wherein the surface roughness Ra of the viewer side surface of the nearest-to-viewer side screen member is $0\ \mu m \leq Ra \leq 0.5\ \mu m$ at least in light outgoing portions, through which image light is transmitted, of the viewer side surface.

3. A transmission type screen according to claim 1, characterized in that an amount of warping of the screen member located nearest to a light source side of the plurality of screen members is equal to or less than the amount of warping D of the nearest-to-viewer side screen member.

4. A transmission type screen according to claim 1, characterized in that the nearest-to-viewer side screen member is a screen member having the smooth surface formed on a viewer side surface as well as having a lenticular lens group formed on a light source side surface.

5. A transmission type screen according to claim 4, characterized in that the nearest-to-viewer side screen member has the smooth surface formed on the viewer side surface in its entirety.

6. A transmission type screen according to claim 4, characterized in that the nearest-to-viewer side screen member is formed by bonding a member for forming the smooth surface and a member for forming the lenticular lens group to each other.

7. A transmission type screen according to claim 1, characterized in that the nearest-to-viewer side screen member is a screen member having the smooth surface formed on a viewer side surface as well as having a fly eye lens group formed on a light source side surface.

8. A transmission type screen according to claim 7, characterized in that the nearest-to-viewer side screen member has the smooth surface formed on the viewer side surface in its entirety.

9. A transmission type screen according to claim 7, characterized in that the nearest-to-viewer side screen member is formed by bonding a member for forming the smooth surface and a member for forming the fly eye lens group to each other.

10. A transmission type screen according to claim 1, characterized in that a reflection preventing layer formed on at least light outgoing portions, through which image light is transmitted, of the nearest-to-viewer side screen member.

11. A transmission type screen according to claim 1, wherein the various optical functions of light are one or more optical functions selected from the group consisting of transmission, diffusion, and condensing.

* * * * *